(12) United States Patent
Heinken et al.

(10) Patent No.: US 10,815,876 B2
(45) Date of Patent: Oct. 27, 2020

(54) METHOD FOR OPERATING AN INTERNAL COMBUSTION ENGINE AND THE INTERNAL COMBUSTION ENGINE

(71) Applicant: Volkswagen Aktiengesellschaft, Wolfsburg (DE)

(72) Inventors: Sebastian Heinken, Braunschweig (DE); Javier Bartolome, Braunschweig (DE); Manuel Vahldiek, Braunschweig (DE); Dirk Hagelstein, Braunschweig (DE); Arne Staats, Gifhorn (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/504,085

(22) Filed: Jul. 5, 2019

(65) Prior Publication Data
US 2020/0011232 A1    Jan. 9, 2020

(30) Foreign Application Priority Data

Jul. 5, 2018  (DE) .................. 10 2018 211 091

(51) Int. Cl.
| | |
|---|---|
| F02B 37/22 | (2006.01) |
| F04D 27/02 | (2006.01) |
| F04D 29/46 | (2006.01) |
| F02M 26/06 | (2016.01) |

(52) U.S. Cl.
CPC ........ F02B 37/225 (2013.01); F04D 27/0246 (2013.01); F04D 29/462 (2013.01); *F02M 26/06* (2016.02)

(58) Field of Classification Search
CPC ...... F02B 37/225; F02B 37/126; F02B 33/40; F02B 37/162; F04D 27/0246; F04D 29/464
See application file for complete search history.

(56) References Cited

U.S. PATENT DOCUMENTS 5,025,629 A * 6/1991 Woollenweber ...... F01D 17/141
                                                                                415/160
9,777,640 B2   10/2017 Mohtar et al.
(Continued)

FOREIGN PATENT DOCUMENTS

| DE | 102010026176 A1 | 1/2012 |
|---|---|---|
| DE | 102012011423 B3 | 11/2013 |

(Continued)

OTHER PUBLICATIONS

U.S. Appl. No. 16/504,063, filed Jul. 5, 2019.
Korean Office Action for Korean Application No. 10-2019-0079812 dated Jun. 23, 2020—English translation.

*Primary Examiner* — Ngoc T Nguyen
(74) *Attorney, Agent, or Firm* — Muncy, Geissler, Olds & Lowe, P.C.

(57) ABSTRACT

A method for operating an internal combustion engine is provided, wherein the internal combustion engine has at least one combustion engine and a fresh gas line and wherein a compressor, to which a trim adjuster is assigned, is integrated into the fresh gas line, said trim adjuster by which an edge section of the inlet cross section of a compressor wheel can be covered to a variable extent. In this case, the edge section of the inlet cross section is covered relatively little in a release position of the trim adjuster and covered relatively greatly in a covering position of the trim adjuster. It is provided that the trim adjuster is adjusted between the release position and the covering position, when substantially the same compressor pressure ratio and substantially the same fresh gas mass flow and substantially the same compressor efficiency are achieved in both operating positions.

11 Claims, 5 Drawing Sheets

(56) References Cited

U.S. PATENT DOCUMENTS

| | | |
|---|---|---|
| 2005/0257520 A1 | 11/2005 | Fischle et al. |
| 2014/0003930 A1* | 1/2014 | Shioda .................. F04D 29/464 415/203 |
| 2015/0192133 A1* | 7/2015 | An ........................ F04D 29/462 415/203 |
| 2016/0177956 A1* | 6/2016 | Mohtar ............... F04D 27/0253 417/406 |
| 2017/0152862 A1* | 6/2017 | Houst .................. F02B 37/183 |
| 2018/0094647 A1 | 4/2018 | Puzik et al. |
| 2019/0285086 A1* | 9/2019 | Mohtar ................. F02B 37/225 |
| 2020/0011231 A1* | 1/2020 | Bartolome ............ F02B 37/225 |

FOREIGN PATENT DOCUMENTS

| | | | |
|---|---|---|---|
| DE | 102014225716 A1 | 7/2015 | |
| DE | 102015209704 A1 | 8/2016 | |
| DE | 10 2015 203 551 | 9/2016 | |
| DE | 102015209666 A1 | 12/2016 | |
| DE | 102017209598 A1 | 5/2017 | |
| DE | 10 2017 005 412 A1 | 12/2017 | |
| EP | 3018355 A1 | 5/2016 | |
| EP | 3 176 440 A1 | 6/2017 | |
| EP | 3372803 A1 * | 9/2018 | ........... F01D 17/146 |
| EP | 3495665 A1 * | 6/2019 | ........... F02B 37/225 |
| EP | 3 543 538 A1 | 9/2019 | |
| JP | 2002004904 A * | 1/2002 | ........... F02D 41/005 |
| JP | 2013-217318 A | 10/2013 | |
| JP | 2017-020514 A | 1/2017 | |
| WO | WO 01/55575 A1 | 8/2001 | |
| WO | WO2004022956 A1 | 3/2004 | |
| WO | WO 2013/074503 A1 | 5/2013 | |
| WO | WO2014131790 A1 | 9/2014 | |
| WO | WO-2018106620 A1 * | 6/2018 | ........... F04D 29/464 |

* cited by examiner

METHOD FOR OPERATING AN INTERNAL COMBUSTION ENGINE AND THE INTERNAL COMBUSTION ENGINE

This nonprovisional application claims priority under 35 U.S.C. § 119(a) to German Patent Application No. 10 2018 211 091.3, which was filed in Germany on Jul. 5, 2018, and which is herein incorporated by reference.

BACKGROUND OF THE INVENTION

Field of the Invention

The present invention relates to a method for operating an internal combustion engine and to an internal combustion engine suitable for carrying out such a method. The invention also relates to a motor vehicle with such an internal combustion engine.

The fresh gas to be supplied via a fresh gas line to a combustion engine of the internal combustion engine is compressed in a compressor of an internal combustion engine. The increase in the pressure of the fresh gas is dependent on the rotational speed of the compressor wheel and on the mass flow of the fresh gas fed through the compressor wheel. In the direction of the so-called surge limit of the compressor characteristic map, the inflow to the leading edges of the wheel blades takes place increasingly on the pressure side as a result of the inflow speed decreasing with respect to the peripheral speed; i.e., the incidence of the inflow increases steadily. Starting at a limit value of the incidence dependent on the operating point, the so-called surge limit, the flow separates at the inlet edges and the flow in the compressor becomes unstable. In the region of the surge limit, a backflow region of low-pulsation fluid is formed on the inlet-side housing contour of the compressor. This so-called backflow bubble leads to a drop in compressor efficiency due to swirl and mixing losses. In the area of the wheel hub contour but also near the surge limit, a pulse-rich and low-loss core flow runs through the compressor, which determines the mass flow rate and the pressure build-up.

Description of the Background Art

A trim adjuster, as is known, for example, from DE 10 2010 026 176 A1, EP 3 018 355 A1, DE 10 2015 209 704 A1, DE 10 2014 225 716 A1, or WO 2014/131790 A1, is used for shifting the surge limit of a compressor characteristic map in the direction of relatively low mass flows at high pressure ratios. At the same time, in the region of the surge limit a trim adjuster can cause an increase in compressor efficiency. For this purpose, a trim adjuster comprises a device by means of which the inflow cross section, in which the compressor wheel is impinged, can be changed. As a result of the thus achieved nozzle effect of the trim adjuster, with increasing control intervention (reduction of the inflow cross section), the gas flow can be focused more greatly on the inlet cross section, close to the hub, of the compressor wheel. As a result, less gas flows to the low-pulse and high-loss region of the backflow bubble, and the core flow in the region close to the hub is accelerated and thereby additionally stabilized. The acceleration of the gas flow in the region, close to the hub, of the compressor wheel inflow additionally results in a shift of the compressor wheel inflow, which can contribute to a further stabilization of the gas flow. The stabilization of the core flow leads to the desired shift of the surge limit of the compressor characteristic map toward lower mass flows. In an unwanted control intervention (trim adjuster fully open), preferably the entire cross section of the fresh gas line before the compressor wheel is released, so that preferably no additional friction losses or throttling losses occur in the then existing inflow to the compressor wheel. The compressor efficiency and the width of the compressor characteristic map are therefore not adversely affected to a meaningful extent by a trim adjuster in the direction of the choke limit.

WO 2004/022956 A1 discloses a method by which operation of a compressor of an internal combustion engine in the region of the surge limit is to be avoided. In this case, the behavior of the compressor is monitored by means of an air flow sensor, which is disposed in an intake section of the internal combustion engine, with regard to a characteristic oscillation behavior of the fresh gas flowing through the intake section. If it is determined in this way that there is an imminent threat that the surge limit will be reached, the value for the desired boost pressure to be achieved is reduced, for which purpose inflow to an exhaust gas turbine driving the compressor occurs in a correspondingly modified manner by means of an adjustment of a device for variable turbine inflow (VTG).

SUMMARY OF THE INVENTION

It is therefore an object of the present invention to provide an internal combustion engine which is supercharged by means of a compressor and is characterized by the best possible operating behavior.

According to an exemplary embodiment of the invention, a method for operating an internal combustion engine is provided, wherein the internal combustion engine comprises at least one combustion engine and a fresh gas line, wherein a compressor is integrated into the fresh gas line and wherein the compressor is assigned a trim adjuster by which an edge section of the inlet cross section of a compressor wheel can be covered to a variable extent, wherein the edge section of the inlet cross section is covered relatively little in a release position of the trim adjuster (compared to a covering position), preferably as little as possible (i.e., as little as is possible due to the structural design), and is covered relatively greatly in the covering position of the trim adjuster (compared to the release position), preferably as much as possible (i.e., as much as is possible due the structural design, this maximum position being determined as optimal for a corresponding operation of the compressor). In order to achieve the most advantageous switching possible between these operating positions of the trim adjuster, it is provided that the trim adjuster is adjusted between the release position and the covering position, i.e., from the release position to the covering position or vice versa, when the same compressor pressure ratio (up to a 1% deviation) and the same fresh gas mass flow (up to a 1% deviation) through the compressor (in particular substantially the same reduced fresh gas mass flow) and substantially the same compressor efficiency (up to a 5%, preferably up to a 2% deviation) are achieved in both operating positions. This enables an adjustment of the trim adjuster without repercussions on engine parameters, i.e., without a discontinuity in the course of the engine-generated torque and without the need for further engine interventions, such as, for example, an adjustment of a throttle valve, a camshaft adjuster, and/or the ignition angle during operation of the internal combustion engine.

The compressor pressure ratio is defined here as the ratio of the absolute pressure $p_2$ of the fresh gas on the high-pressure side of the compressor to the absolute pressure $p_1$ of the fresh gas on the low-pressure side of the compressor. The reduced fresh gas mass flow $\dot{m}_{red}$ is calculated from the actual mass flow m, the temperature $T_{vV}$ of the fresh gas on the low-pressure side of the compressor, a reference temperature $T_{ref}$ (293.15 K), the absolute pressure $p_{vV}$ of the fresh gas on the low-pressure side of the compressor, and a reference pressure $p_{ref}$ (1000 mbar) according to the following formula:

$$\dot{m}_{red} = \dot{m} \cdot \sqrt{\frac{T_{UV}}{T_{ref}} \cdot \frac{p_{ref}}{p_{vV}}}$$

An internal combustion engine suitable for the automated execution of a method of the invention comprises at least one combustion engine (in particular a (self-ignited and quality-controlled) diesel engine or a (spark-ignited and quantity-controlled) gasoline engine or a combination thereof, e.g., a combustion engine with homogeneous compression ignition) and a fresh gas line, wherein a compressor is integrated into the fresh gas line and wherein the compressor is assigned a trim adjuster by which an edge section of the inlet cross section of a compressor wheel can be covered to a variable extent. In this case, the edge section of the inlet cross section is covered relatively little, preferably as little as possible, in a release position of the trim adjuster and is covered relatively greatly, preferably as much as possible, in a covering position of the trim adjuster. Further, such an internal combustion engine comprises a control device which is configured for automatically executing a method of the invention.

The "inlet plane" of the compressor wheel according to the invention can be understood to mean the plane located closest to the trim adjuster, oriented perpendicular to the rotational axis of the compressor wheel, and defined by the compressor wheel blades, in that at least one punctiform section of one inlet edge or multiple or all inlet edges of these wheel blades are disposed within this plane. The "inlet cross section" of the compressor wheel is then the opening cross section, located in this inlet plane, of the flow chamber.

The trim adjuster of an internal combustion engine of the invention can in principle be designed as desired, for example, according to one of the designs, as disclosed in DE 10 2010 026 176 A1, EP 3 018 355 A1, DE 10 2015 209 704 A1, DE 10 2014 225 716 A1, or WO 2014/131790 A1, which are incorporated herein by reference.

The trim adjuster of an internal combustion engine of the invention comprises an annular aperture. The aperture can be embodied, for example, in the form of an iris diaphragm, as is generally known from photographic lenses. Alternatively, the aperture can also comprise a particularly annular stator and a particularly annular rotor, which are arranged side by side in the longitudinal axial direction, wherein both the stator and the rotor each form at least one through opening, wherein these through openings can be moved by rotation of the rotor relative to the stator into various relative positions in which they do not overlap or overlap partially or completely. A trim adjuster, which comprises only one such aperture, can be characterized by a relatively simple structural design.

The trim adjuster with an annular aperture, can additionally comprise a flow guiding device, by which at least one section of the fresh gas line is divided into a central flow region and a peripheral flow region, both of which in the region of the inlet plane of the compressor wheel transition into a compressor flow chamber accommodating the compressor wheel, wherein the peripheral flow region is designed closable by means of the aperture as needed. The aperture can preferably be arranged at the upstream end of the peripheral flow region. By means of such a combination of an aperture and flow guiding device, the function of the trim adjuster can be improved, in particular with regard to the positive effect on the compressor characteristic map, in comparison with a trim adjuster comprising only an annular aperture.

The effect of such a trim adjuster with an aperture and flow guiding device can be improved still further if at least one flow guiding device end section, located adjacent to the compressor wheel, optionally the entire flow guiding device, is formed movable along the longitudinal axis (i.e., along the axis of rotation of the compressor wheel), wherein the peripheral flow region in the region of the inlet plane of the compressor wheel is closed by this end section in a closed position of the flow guiding device and released in an open position.

Because the compressor efficiencies during the operation of the internal combustion engine cannot be measured directly, the exhaust gas pressure upstream of an exhaust gas turbine, which is connected to the compressor in a rotationally driven manner, can be used for information about the overall efficiency of the exhaust gas turbocharger for an operating condition of the engine. For this purpose, an internal combustion engine of the invention can comprise an exhaust gas pressure sensor integrated into the exhaust gas line of the internal combustion engine upstream of the exhaust gas turbine. Preferably, it can be provided that in an application mode of the internal combustion engine for a plurality of operating states in each case the exhaust gas pressures are determined upstream of the exhaust gas turbine for the operation of the compressor with the trim adjuster in the release position, on the one hand, and in the covering position, on the other, and an adjustment range for all operating conditions is derived and especially interpolated therefrom, wherein the determined adjustment range is used for a normal operation of the internal combustion engine. This makes it possible, by relatively few measurements in the context of an application operation, which can be carried out in particular on a test bench, to derive an operating map for the internal combustion engine with an adjustment range integrated therein. This adjustment range then provides the information required to adjust the trim adjuster for all operating conditions that can occur during the normal operation of the internal combustion engine.

An adjustment can be made between the release position and the covering position when the same compressor efficiency plus a hysteresis value, for example, 2%, is achieved at identical compressor pressure ratios and fresh gas mass flows. The compressor efficiency in the operating position into which the trim adjuster is adjusted should therefore be greater than the compressor efficiency in the operating position from which the trim plate is adjusted when the adjustment is made by the hysteresis value. As a result, a relatively frequent adjustment of the trim adjuster and thereby possible mechanical overloading of the trim adjuster can be avoided in the case of continuous operation of the internal combustion engine in the adjustment range for the trim adjuster.

An internal combustion engine of the invention can be, for example, part of a motor vehicle. In this case, the combustion engine of the internal combustion engine can be provided in particular for the direct or indirect provision of the drive power for the motor vehicle. Such a motor vehicle can, in particular, be a wheel-based and not a rail-bound motor vehicle (preferably a passenger vehicle or truck).

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
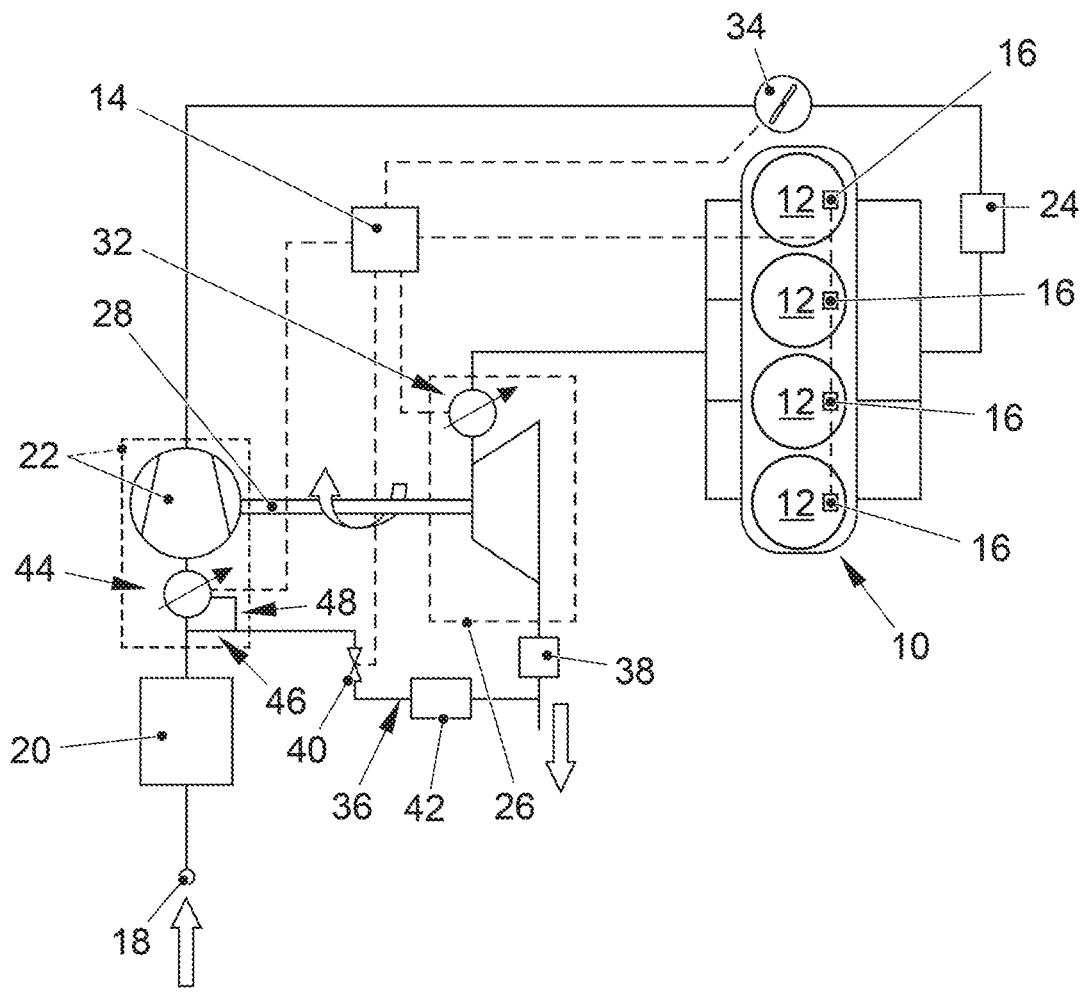
FIG. 1 shows an internal combustion engine of the invention.

FIG. 1 shows a schematic representation of an internal combustion engine of the invention with a combustion engine 10 designed as a gasoline engine and forming a plurality of cylinders 12. Cylinders 12, together with pistons guided up and down therein and a cylinder head delimit combustion chambers in which fresh gas is burned together with fuel. The fuel is injected, controlled by a control device 14 (engine control), by means of injectors 16 directly into the combustion chambers. The burning of the fuel/fresh gas mixture amounts leads to the cyclic up and down movements of the pistons, which in turn are transmitted in a known manner via connecting rods, not shown, to a crankshaft, also not shown, whereby the crankshaft is rotationally driven.

The fresh gas is supplied to combustion engine 10 via a fresh gas line and, for this purpose, drawn in from the environment via an intake port 18, cleaned in an air filter 20, and then fed into a compressor 22, which is part of an exhaust gas turbocharger. The fresh gas is compressed by compressor 22, then cooled in a charge air cooler 24, and then fed to the combustion chambers. Compressor 22 is driven by an exhaust gas turbine 26 of the exhaust gas turbocharger, said turbine being integrated into an exhaust gas line of the internal combustion engine. Exhaust gas, which forms in the combustion chambers of internal combustion engine 10 during the burning of the fuel/fresh gas mixture amounts, is discharged from combustion engine 10 via the exhaust gas line and thereby flows through exhaust gas turbine 26. This leads in a known manner to a rotational driving of a turbine wheel, which is connected rotationally fixed via a shaft 28 to a compressor wheel 30 (cf. FIGS. 2 and 3) of compressor 22. The rotational driving of the turbine wheel is thus transmitted to compressor wheel 30.

In order to realize the best possible use of the enthalpy of the exhaust gas to generate compression power by means of the exhaust gas turbocharger during operation of combustion engine 10 with varying loads and speeds, exhaust gas turbine 26 of the exhaust gas turbocharger can optionally have a device, controllable by control device 14, for variable turbine inflow (VTG) 32. This can comprise in a known manner a plurality of guide blades which are arranged in an inlet channel of exhaust gas turbine 26 and which are formed individually rotatable, it being able to adjust these together by means of an adjusting device. Depending on the rotational positions of the guide blades, these narrow more or less the free flow cross section in the inlet channel of exhaust gas turbine 26 and also influence the section of the primary inflow to the turbine wheel and the orientation of this inflow.

Downstream of compressor 22, a throttle valve 34, which can also be controlled by control device 14, is integrated into the charge air section, i.e., into the section of the fresh gas line that is located between compressor 22 and combustion engine 10.

The internal combustion engine can comprise an exhaust gas recirculation line 36 for implementing a (low-pressure) exhaust gas recirculation, in which exhaust gas can be branched off from a section of the exhaust gas line which is located downstream of exhaust gas turbine 26 and in particular also downstream of an exhaust gas aftertreatment device 38, for example, a particulate filter, and can be introduced into a section of the fresh gas line upstream of compressor wheel 30. The amount of exhaust gas to be recirculated via exhaust gas recirculation line 36 can be controlled or regulated by means of a control valve 40, which can be activated by control device 14. Furthermore, an exhaust gas cooler 42 can be integrated into exhaust gas recirculation line 36 for cooling the exhaust gas guided over it.

Compressor 22 is assigned to a trim adjuster 44, by means of which the inflow of fresh gas to compressor wheel 30 can be influenced. For this purpose, trim adjuster 44 or an associated actuator can be controlled by control device 14. Exhaust gas recirculation line 36 can open into the fresh gas line upstream or on the side of trim adjuster 44 facing away from compressor wheel 30. An opening downstream of or in the region of trim adjuster 44 (and upstream of compressor wheel 30) is also possible.

Figure 2:
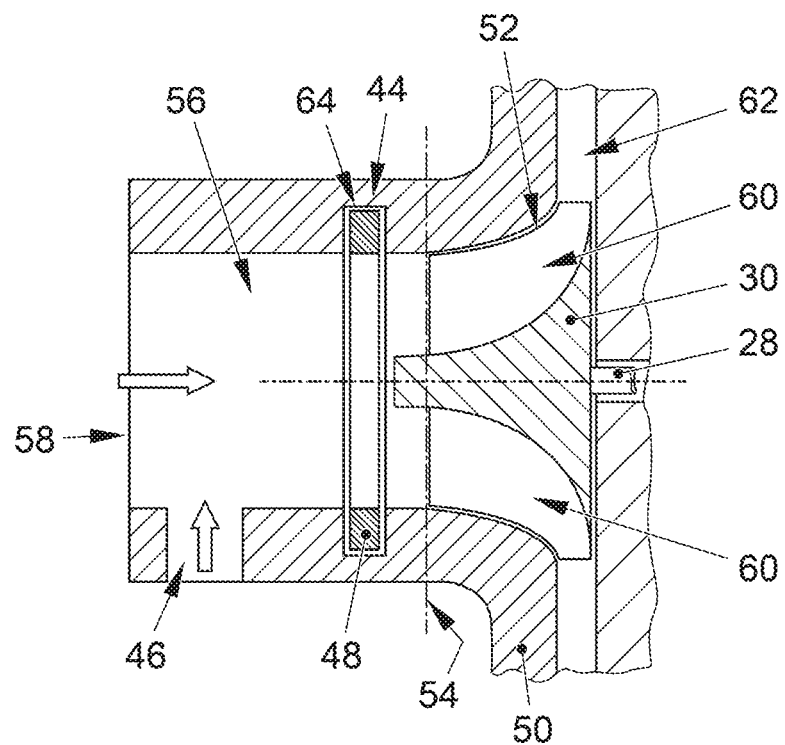
FIG. 2 shows a longitudinal section through a compressor for an internal combustion engine of the invention with an associated trim adjuster in a position covering an inlet cross section of a compressor wheel to the least possible extent.
Figure 3:
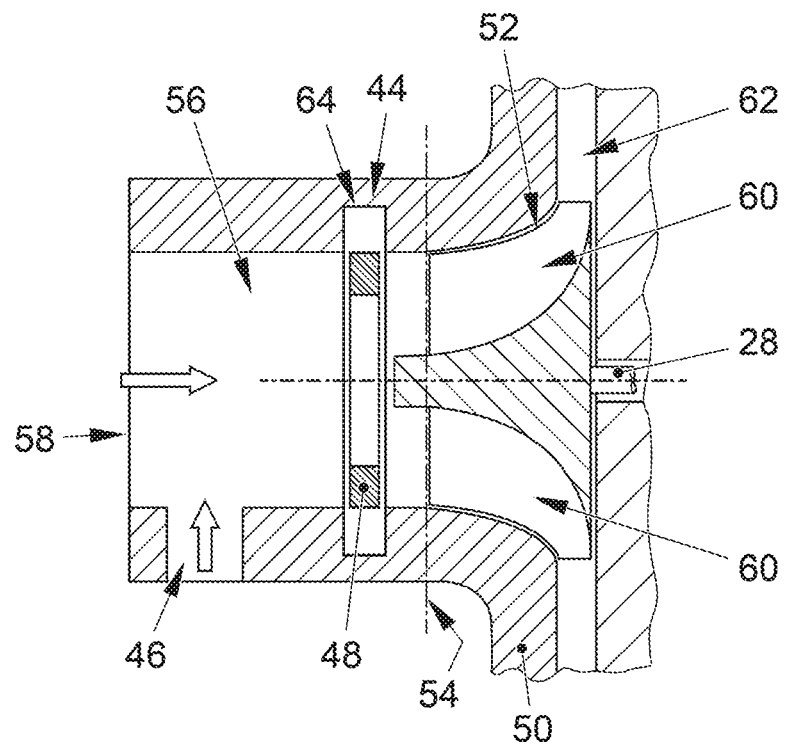
FIG. 3 shows the compressor of FIG. 2 with the trim adjuster in a position covering the inlet cross section of the compressor wheel to the greatest possible extent.

FIGS. 2 and 3 each show in a longitudinal section a possible embodiment of a compressor 22 of an internal combustion engine of the invention. Said compressor 22 can be provided, for example, for an internal combustion engine according to FIG. 1, in which case trim adjuster 44 and a connection channel 46 for exhaust gas recirculation line 36 are then integral components of compressor 22. This is indicated in FIG. 1 by a dashed border.

Compressor 22 according to FIGS. 2 and 3 comprises a housing 50, which can represent a partial housing of an overall housing of an exhaust gas turbocharger. Housing 50 of compressor 22 forms a flow chamber 52 within which compressor wheel 30 is rotatably mounted. On the inlet side, flow chamber 52 has an inlet cross section lying in an inlet plane 54. Fresh gas can be fed from a compressor inlet 58 to compressor wheel 30 via an inlet channel 56 which is likewise formed by housing 50 of compressor 22. On the outlet side, flow chamber 52 is delimited by an "outlet plane" surrounding the outlet edges of wheel blades 60 of compressor wheel 30. This is adjoined by a diffuser chamber 62, which also surrounds the outlet edges of wheel blades 60, and then, as is no longer shown in FIGS. 2 and 3, by a compressor volute. A compressor outlet exits from the compressor volute.

Within inlet channel 56, trim adjuster 44 is located as close as possible to the inlet cross section of compressor wheel 30. Trim adjuster 44 comprises an iris diaphragm 48 with a design that is basically also known from photographic lenses. In a covering position according to FIG. 3, trim adjuster 44 prevents, as much as possible, an inflow of fresh gas to compressor wheel 30, which flows in the direction of compressor wheel 30, in an annular region of the inlet cross section, said region being located at the edge. Trim adjuster 44 thereby focuses this fresh gas flow onto a section, close to the hub, of compressor wheel 30. In contrast, in a release position according to FIG. 2, the fresh gas can flow into compressor wheel 30 over the entire inlet cross section. The aperture elements which form iris diaphragm 48 and which to open or close iris diaphragm 48 are each mounted pivotable about an axis within housing 50, are arranged in the release position completely in an annular recess 64 of housing 50.

It is provided according to the invention that, during operation of an internal combustion engine in accordance with FIG. 1, trim adjuster 44 is adjusted between the release position and the covering position, when the same compressor pressure ratio Try, the same (reduced) fresh gas mass flow ($\dot{m}_{red}$), and substantially the same compressor efficiency $\eta_V$ are reached in these two operating positions. An adjustment of trim adjuster 44 at only "substantially" the same compressor efficiency $\eta_V$ occurs because the theoretical adjustment point is defined both by the same values for the compressor pressure ratio $\pi_V$ and the reduced fresh gas mass flow $\dot{m}_{red}$ and by the same values for the compressor efficiency $\eta_V$, but a hysteresis value is provided for the actual adjustment, whereby a relatively frequent adjustment of trim adjuster 44 is to be avoided in a longer-lasting operation of the internal combustion engine in the range of the theoretical adjustment point. The corresponding hysteresis value here is, for example, 2%.

Figure 4:
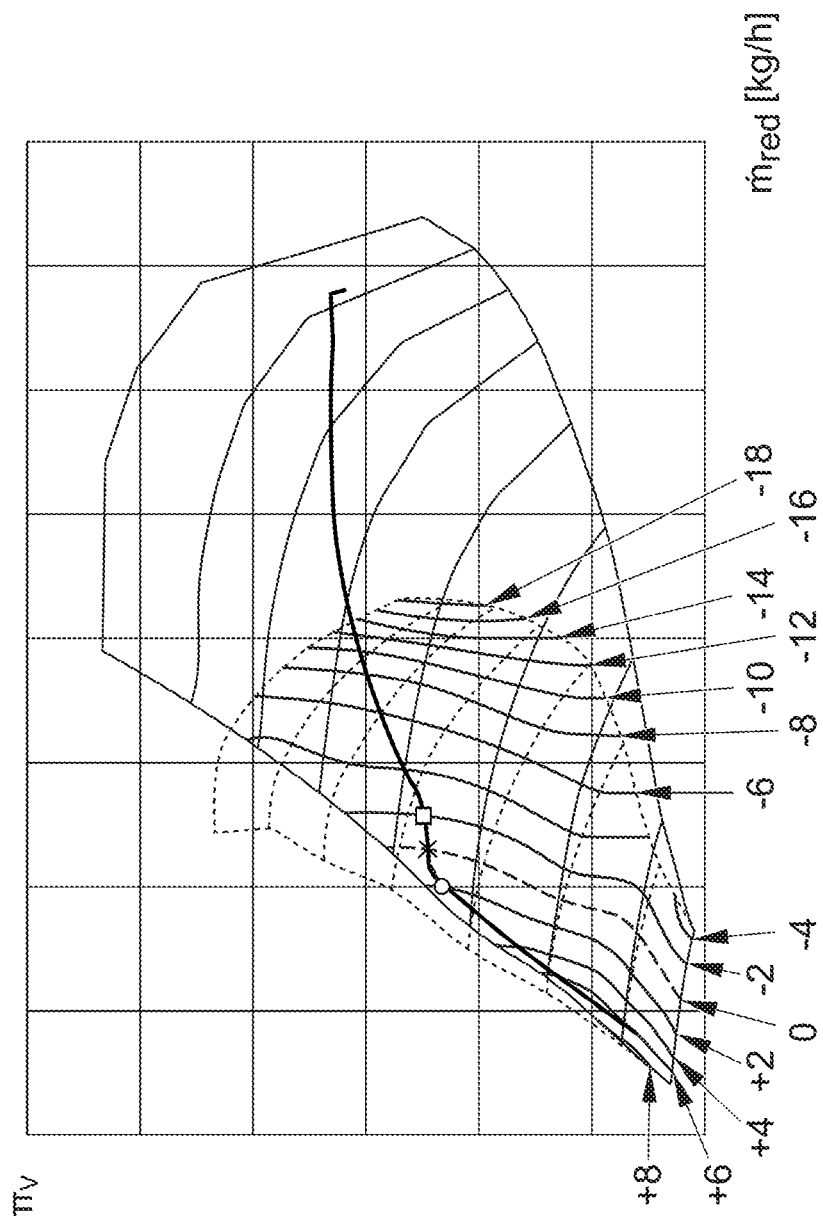
FIG. 4 shows a characteristic map of a compressor according to FIGS. 2 and 3.

In order to determine a switching range for compressor 22 which takes into account said hysteresis value, the two compressor characteristic maps for operation of compressor 22 with trim adjuster 44 are determined in a known manner in an application mode of the internal combustion engine in a release position, on the one hand, and in a covering position, on the other, and placed in relation to one another, as is shown by way of example in FIG. 4. The compressor characteristic map, which is drawn by solid lines, is the one that describes the operation of compressor 22 with trim adjuster 44 in the release position, whereas the compressor characteristic map, which is drawn by dotted lines, characterizes the operation of compressor 22 with trim adjuster 44 in the covering position.

Figure 5:
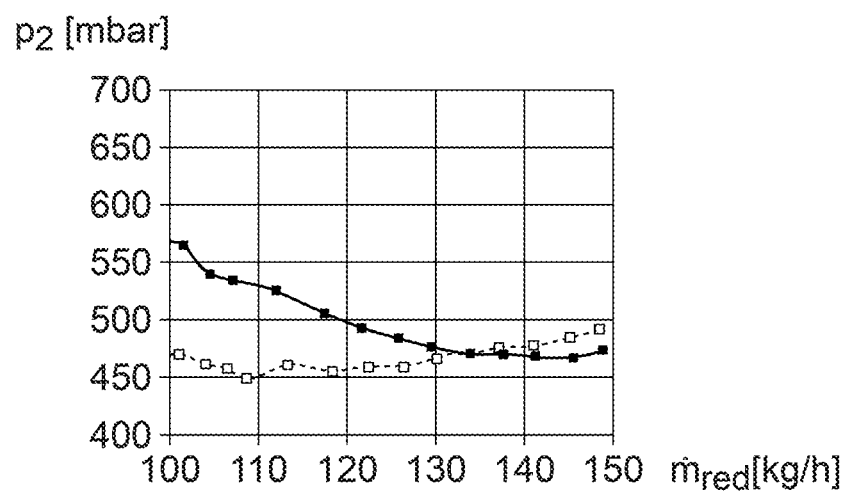
FIG. 5 shows the curves of the exhaust gas pressures upstream of the exhaust gas turbine of an exhaust gas turbocharger, comprising a compressor according to FIGS. 2 and 3, in each case, versus the reduced mass flow of the fresh gas through the compressor, on the one hand, with the trim adjuster of the compressor in the covering position and, on the other hand, with the trim adjuster in the release position.
Figure 6:
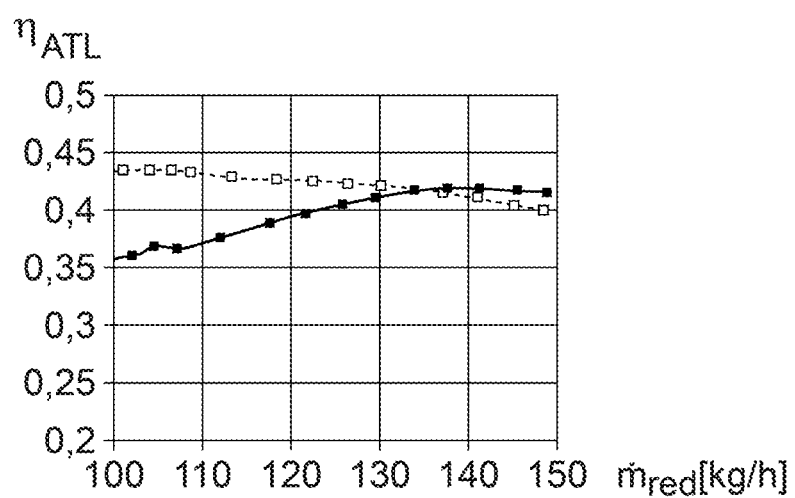
FIG. 6 shows the curves, corresponding to FIG. 5, for the efficiencies of the exhaust gas turbocharger.
Figure 7:
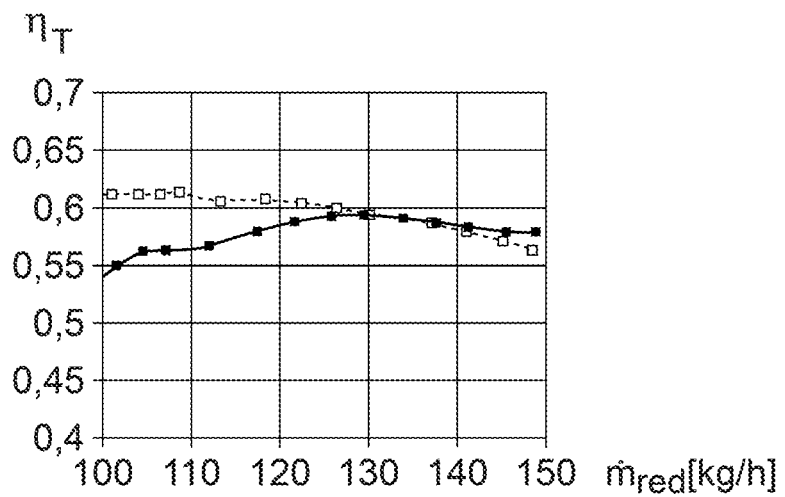
FIG. 7 shows the curves, corresponding to FIG. 5, for the efficiencies of the exhaust gas turbine.
Figure 8:
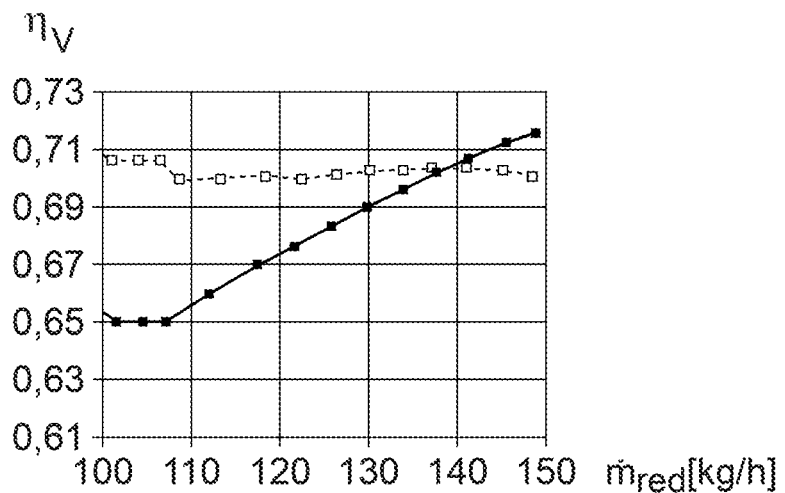
FIG. 8 shows the curves, corresponding to FIG. 5, for the efficiencies of the compressor.
Figure 9:
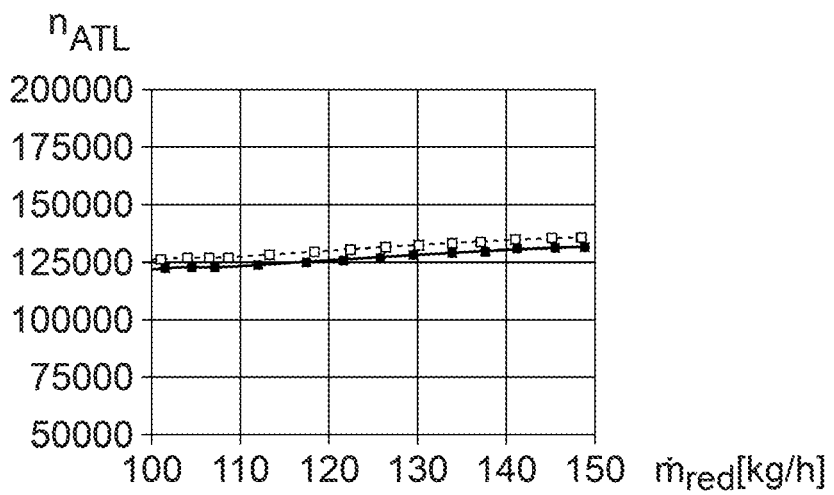
FIG. 9 shows the curves, corresponding to FIG. 5, for the rotational speeds of the exhaust gas turbocharger.

Furthermore, for a plurality of defined compressor pressure ratios Try, in each case the compressor efficiency $\eta_V$ is determined in an operation with trim adjuster 44 in the release position, on the one hand, and with trim adjuster 44 in the covering position, on the other hand. In this case, the compressor efficiency $\eta_V$ is determined as a function of a measurement of the exhaust gas pressure in the exhaust line of the internal combustion engine upstream of exhaust gas turbine 26. The two corresponding curves (versus the reduced fresh gas mass flow), again for trim adjuster 44 in the release position (solid line) and for trim adjuster 44 in the covering position (dotted line), are determined in FIG. 5 for an exemplary compressor pressure ratio $\pi_V$ based on a boost pressure $p_2$ of 1600 mbar. The corresponding curves for the efficiencies $\eta_{ATL}$ of the exhaust gas turbocharger as a whole (FIG. 6) and for the efficiencies $\eta_T$, $\eta_V$ of exhaust gas turbine 26 (FIG. 7) and compressor 22 (FIG. 8), influencing these efficiencies $\eta_{ATL}$ of the exhaust gas turbocharger, are shown in a further diagram. The diagram of FIG. 9 additionally shows the curves for the rotational speeds $n_{ATL}$ of the exhaust gas turbocharger during the corresponding measurements.

In the (double) characteristic map according to FIG. 4, curves corresponding to different values of the efficiency differences between the two operating positions of trim adjuster 44 are drawn for the area in which the two compressor characteristic maps overlap and in which, consequently, operation of compressor 22 with trim adjuster 44 in either the covering position or the release position is basically possible. Positive percentage values here indicate an efficiency advantage for operating compressor 22 with trim adjuster 44 in the covering position, whereas negative percentage values indicate an efficiency advantage for operating compressor 22 with trim adjuster 44 in the release position. The dotted line shows the (equality) curve on which the compressor efficiencies $\eta_V$ are identical or the differences in efficiencies are zero. A theoretical adjustment point for adjusting trim adjuster 44 between the release position and the covering position for a defined compressor pressure ratio $\pi_V$ and a defined reduced fresh gas mass flow $\dot{m}_{red}$ therefore lies on this curve, a hysteresis value of 2% being taken into account for an actual adjustment. If therefore, for example, compressor 22 is operated with trim adjuster 44 in the release position at a specific compressor pressure ratio $\pi_V$ and a specific reduced fresh gas mass flow $\dot{m}_{red}$, in which an efficiency advantage is achieved compared with a corresponding operation with trim adjuster 44 in the covering position (i.e., the position of such an operating point would be to the right of the dashed curve in the map of FIG. 4), and during further operation, the compressor pressure ratio $\pi_V$ and/or the reduced fresh gas mass flow $\dot{m}r_{ed}$ change such that this operating point shifts in the direction of the dashed equality curve, then the trim adjuster is not adjusted when the dashed equality curve is reached, but only when (and if) the operating point reaches the curve for the two-percent efficiency advantage (hysteresis value) of an operation of compressor 22 with trim adjuster 44 in the covering position. In FIG. 4, this is illustrated for the full load curve, drawn as an example, by means of a cross, which designates the theoretical adjustment point, and a circle, which designates the actual adjustment point. In the same way, an adjustment from the covering position to the release position would only take place upon reaching a relevant efficiency advantage of 2%, as shown in FIG. 4 on the basis of the adjustment point marked by a rectangle on the full load curve.

The invention being thus described, it will be obvious that the same may be varied in many ways. Such variations are not to be regarded as a departure from the spirit and scope of the invention, and all such modifications as would be obvious to one skilled in the art are to be included within the scope of the following claims:

What is claimed is:

1. A method for operating an internal combustion engine comprising an engine and a fresh gas line, the method comprising:
   integrating a compressor into the fresh gas line; and
   assigning the compressor to a trim adjuster via which an edge section of an inlet cross section of a wheel of the compressor is adapted to be covered to a variable extent, wherein the edge section of the inlet cross section is uncovered in a release position of the trim adjuster and is covered in a covering position of the trim adjuster; and
   adjusting the trim adjuster between the release position and the covering position when substantially a same compressor pressure ratio, substantially a same fresh gas mass flow and substantially a same compressor efficiency are achieved in both the release position and the covering position.

2. The method according to claim 1, wherein the trim adjuster covers the edge section of the inlet cross section as little as possible in the release position and/or covers the edge section of the inlet cross section as much as possible in the covering position.

3. The method according to claim 1, wherein the compressor efficiency is determined based on a measured value for a pressure of the exhaust gas in an exhaust line of the internal combustion engine upstream of an exhaust gas turbine, which is connected to the compressor in a rotationally driven manner.

4. The method according to claim 3, wherein the exhaust gas pressure is determined for a plurality of operating states of the internal combustion engine with the trim adjuster in the release position and determined with the trim adjuster in the covering position and an adjustment range for the plurality of operating states is derived therefrom.

5. The method according to claim 1, wherein the trim adjuster is adjusted between the release position and the covering position when the same compressor efficiency with a hysteresis value added thereto is achieved.

6. The method according to claim 5, wherein the hysteresis value is 2%.

7. An internal combustion engine comprising:
   a combustion engine; and
   a fresh gas line;
   a compressor integrated into the fresh gas line, the compressor being assigned a trim adjuster by which an edge section of an inlet cross section of a wheel of the compressor is adapted to be covered to a variable extent, wherein the edge section of the inlet cross section is uncovered in a release position of the trim adjuster and covered in a covering position of the trim adjuster; and
   a control device configured for automatically executing an adjusting of the trim adjuster between the release position and the covering position when substantially a same compressor pressure ratio, substantially a same fresh gas mass flow and substantially a same compressor efficiency are achieved in both the release position and the covering position.

8. The internal combustion engine according to claim 7, wherein the trim adjuster comprises an annular diaphragm.

9. The internal combustion engine according to claim 7, wherein an exhaust gas pressure sensor is integrated into an exhaust gas line of the internal combustion engine upstream of an exhaust gas turbine.

10. The internal combustion engine according to claim 7, wherein the trim adjuster is adjusted between the release position and the covering position when the same compressor efficiency with a hysteresis value added thereto is achieved.

11. The internal combustion engine according to claim 10, wherein the hysteresis value is 2%.

* * * * *